US009510142B2

(12) United States Patent
Hans et al.

(10) Patent No.: US 9,510,142 B2
(45) Date of Patent: Nov. 29, 2016

(54) METHODS AND APPARATUS FOR PROVIDING PRESENCE SERVICE FOR CONTACT MANAGEMENT REPRESENTATION

(71) Applicant: Apple Inc., Cupertino, CA (US)

(72) Inventors: Martin Hans, Bad Salzdetfurth (DE); Andreas Schmidt, Braunschweig (DE)

(73) Assignee: Apple Inc., Cupertino, CA (US)

( * ) Notice: Subject to any disclaimer, the term of this patent is extended or adjusted under 35 U.S.C. 154(b) by 438 days.

(21) Appl. No.: 13/853,376

(22) Filed: Mar. 29, 2013

(65) Prior Publication Data

US 2013/0231138 A1    Sep. 5, 2013

Related U.S. Application Data

(62) Division of application No. 12/704,455, filed on Feb. 11, 2010, now abandoned.

(51) Int. Cl.
| | |
|---|---|
| *G06F 15/16* | (2006.01) |
| *H04W 4/02* | (2009.01) |
| *G06Q 30/02* | (2012.01) |
| *H04L 12/58* | (2006.01) |

(52) U.S. Cl.
CPC .............. *H04W 4/02* (2013.01); *G06Q 30/02* (2013.01); *H04L 12/5815* (2013.01); *H04L 51/043* (2013.01)

(58) Field of Classification Search
None
See application file for complete search history.

(56) References Cited

U.S. PATENT DOCUMENTS

| | | | | |
|---|---|---|---|---|
| 7,035,618 | B2* | 4/2006 | Schnurr ..................... 455/404.2 |
| 7,620,404 | B2* | 11/2009 | Chesnais et al. ........... 455/456.1 |
| 7,716,140 | B1* | 5/2010 | Nielsen et al. ............... 705/319 |
| 8,023,975 | B2* | 9/2011 | Wickman et al. ........... 455/466 |
| 8,676,232 | B2* | 3/2014 | Bychkov et al. ........... 455/456.2 |
| 2005/0157689 | A1* | 7/2005 | Schnurr ............. H04L 12/5815 370/338 |
| 2008/0132252 | A1* | 6/2008 | Altman et al. ................ 455/457 |
| 2008/0306826 | A1* | 12/2008 | Kramer ................... G06Q 30/02 705/14.14 |
| 2009/0030999 | A1* | 1/2009 | Gatzke et al. ................ 709/207 |
| 2009/0082038 | A1* | 3/2009 | McKiou ................. H04L 51/38 455/456.6 |
| 2009/0098859 | A1* | 4/2009 | Kamdar et al. ............. 455/412.1 |
| 2009/0191898 | A1* | 7/2009 | Lewis et al. ................. 455/456.3 |

(Continued)

Primary Examiner — Joshua Joo
(74) *Attorney, Agent, or Firm* — Meyertons, Hood, Kivlin, Kowert & Goetzel, P.C.

(57) ABSTRACT

Methods and apparatus for providing a presence service for contact management functions such as user address books. The presence service, in an exemplary embodiment, assembles contact entries into abstract groupings and defines event packages specified by the user that enable the user to be notified about presence information dynamically. For example, a subscribed user may receive presence service information for all entries in the users address book that are in close geographical proximity to the subscribed user. In one variant, the storage and calculation of presence information is performed at a centralized location, thereby sparing the user's device from utilizing unnecessary calculation resources and avoiding unnecessary network bandwidth utilization in order to receive presence information of interest. User device-based variants are also disclosed. Business methods utilizing the aforementioned presence service offerings are also provided.

19 Claims, 8 Drawing Sheets

(56) References Cited

U.S. PATENT DOCUMENTS

| | | | |
|---|---|---|---|
| 2009/0319616 A1* | 12/2009 | Lewis, II | H04W 24/00 709/206 |
| 2010/0056183 A1* | 3/2010 | Oh | 455/456.3 |
| 2010/0082667 A1* | 4/2010 | Callanan et al. | 707/770 |
| 2010/0127921 A1* | 5/2010 | Chen et al. | 342/357.07 |
| 2011/0092227 A1* | 4/2011 | Phukan | 455/456.3 |
| 2011/0238755 A1* | 9/2011 | Khan et al. | 709/204 |
| 2012/0329475 A1* | 12/2012 | Ribaudo et al. | 455/456.1 |
| 2013/0179524 A1* | 7/2013 | Granito | G06Q 10/107 709/206 |
| 2013/0281126 A1* | 10/2013 | Drennan | H04L 12/189 455/456.3 |

\* cited by examiner

540

(1) SUBSCRIBE Device A->example.com server

SUBSCRIBE sip:UserA@example.com SIP/2.0
    Via: SIP/2.0/TCP watcherhost.example.com;branch=z9hG4bKnashds7
    To: <sip:UserA@example.com>
    From: <sip:UserA@example.com>;tag=xfg9
    Call-ID: 2010@watcherhost.example.com
CSeq: 17766 SUBSCRIBE
    Max-Forwards:70
    Event: relative-presence  ← 600
    Accept: application/pidf+xml;application/relative-presence+xml ← 610
    Contact: <sip:UserA@watcherhost.example.com>
    Expires: 600
    Content-Length: 766

<?xml version="1.0" encoding="UTF-8"?>
<relative-presence-info
xmlns="urn:ietf:params:xml:ns:relative-presence-info">
<!--
  RELATION INFO
-->                      ← 620
<relation-info>  ← 630
  <rel-type type="Location">  ← 640
    <rel-value type="relative">
      <rel-value-data>mid-distance</rel-value-data>  ← 642
    </rel-value>
    <rel-value type="absolute">  ← 650
      <rel-value-data>100m</rel-value-data>
    </rel-value>                    ← 652
  </rel-type>
</relation-info>
<!--
  RELATED USERS
-->
<users>
  <user entity="sip:alice@aol.com"></user>
  <user entity="sip:bob@tmobile.com"></user>
  <user entity="sip:charlie@gmx.com"></user>   } 660
  <user entity="sip:dady@ibm.com"></user>
  <user entity="sip:emmy@bmi.com"></user>
</users>
</relative-presence-info>

FIG. 6

```
(3) NOTIFY example.com server-> Device A

NOTIFY sip:UserA@watcherhost.example.com SIP/2.0
    Via: SIP/2.0/TCP server.example.com;branch=z9hG4bKna998sk
    From: <sip:UserA@example.com>;tag=ffd2
    To: <sip:UserA@example.com>;tag=xfg9
    Call-ID: 2010@watcherhost.example.com
    Event: relative-presence                          ← 700
    Subscription-State: active;expires=599
    Max-Forwards: 70
    CSeq: 8775 NOTIFY
    Contact: sip:server.example.com
    Content-Type: application/relative-presence+xml   ← 710
    Content-Length: 966

[<?xml version="1.0" encoding="UTF-8"?>
<relative-presence-info
 xmlns="urn:ietf:params:xml:ns:relative-presence-info">
<!--
  RELATION INFO
-->                              720
<relation-info>           ←           730
  <rel-type type="Location">    ←
    <rel-value type="relative">   ← 740
      <rel-value-data>mid-distance</rel-value-data>   ← 742
    </rel-value>
  </rel-type>
</relation-info>
<!--
  RELATED USERS
-->                       750
<users state="full">  ←              760
  <user entity="sip:alice@aol.com">  ←
    <proximity-state>Not near</proximity-state>  ←
  </user>                                         762
  <user entity="sip:bob@tmobile.com">
    <proximity-state>Not near</proximity-state>
  </user>
  <user entity="sip:charlie@gmx.com">
    <proximity-state>Not near</proximity-state>
  </user>
  <user entity="sip:dady@ibm.com">
    <proximity-state>Not near</proximity-state>
  </user>                                    770
  <user entity="sip:emmy@bmi.com">  ←
    <proximity-state>Not allowed</proximity-state>  ←
  </user>                                           772
</users>
</relative-presence-info>
```

```
(3) NOTIFY example.com server-> Device A

NOTIFY sip:UserA@watcherhost.example.com SIP/2.0
  Via: SIP/2.0/TCP server.example.com;branch=z9hG4bKna998sk
  From: <sip:UserA@example.com>;tag=ffd2
  To: <sip:UserA@example.com>;tag=xfg9
  Call-ID: 2010@watcherhost.example.com
  Event: relative-presence               ← 800
  Subscription-State: active;expires=599
  Max-Forwards: 70
  CSeq: 8775 NOTIFY
  Contact: sip:server.example.com
  Content-Type: application/relative-presence+xml  ← 810
  Content-Length: 966

<?xml version="1.0" encoding="UTF-8"?>
<relative-presence-info
 xmlns="urn:ietf:params:xml:ns:relative-presence-info">
<!--
  RELATED USERS
-->                                  850
  <users state="partial">  ←              ← 860
    <user entity="sip:alice@aol.com">  ←
      <proximity-state>Near</proximity-state>   ← 862
      <proximity-value>15m</proximity-value>    ← 864
    </user>
    <user entity="sip:bob@tmobile.com">  ← 870
      <proximity-state>Near</proximity-state>   ← 872
      <proximity-value>20m</proximity-value>    ← 874
    </user>
  </users>
</relative-presence-info>
```

METHODS AND APPARATUS FOR PROVIDING PRESENCE SERVICE FOR CONTACT MANAGEMENT REPRESENTATION

CROSS-REFERENCE TO RELATED APPLICATIONS

This application is a division of U.S. patent application Ser. No. 12/704,455, filed on Feb. 11, 2010, entitled "METHODS AND APPARATUS FOR PROVIDING PRESENCE SERVICE FOR CONTACT MANAGEMENT REPRESENTATION", which is related to co-owned and co-pending U.S. patent application Ser. No. 12/704,449 filed on Feb. 11, 2010 and entitled "METHODS AND APPARATUS FOR CONTACT INFORMATION REPRESENTATION". Those prior patent applications are hereby incorporated by reference in their entireties as though fully and completely set forth herein.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of data representation. More particularly, in one exemplary aspect, the present invention is directed to methods and apparatus for providing a network presence service utilized for contact information representation in e.g., user equipment devices.

2. Description of Related Technology

Address books, in an electronic form, are databases that are used for storing entries that are now colloquially known by users as "contacts". Due to the ever growing list of capabilities of today's computing devices (such as desktop computers, laptops, smartphones and the like), the information stored in these contact entries has also grown such that individual entries now may include without limitation: (1) a name; (2) a picture associated with the name; (3) various phone number(s) (i.e., home, work, cellular, etc.); (4) e-mail address(es) (both personal and work-related); (5) fax number(s); (6) user name(s) associated with various services (i.e. instant messaging applications, Facebook™, Twitter™, etc.); and (7) various other related information associated with a user (i.e., birthdays, names of related family members, anniversary dates, etc.).

In addition to the large amount of information now stored within individual contact entries associated with a user's address book, the number of contacts stored in the user's address book has also grown such that there are often too many entries to be easily navigated. This results from a number of factors, including the intermingling of less frequently used contact entries among contact entries that are more commonly used. Furthermore, because contact entries are now frequently entered and shared during an initial meeting with a personal acquaintance or business associate (whether manually or electronically), these names tend to become forgotten by the user, making it difficult to later recall the name of that particular acquaintance or business associate, or how the user knows them.

Various methods and apparatus exist in the prior art for managing a user's contact list entries. For example, the Gmail™ webmail service provided by Google, Inc. allows a user to arrange contact list entries according to various user-defined groupings. However, these various groupings must be manually assembled by the user, and therefore have many of the same limitations of prior art address books as discussed above.

Other common address book implementations, such as the address book available in many existing smartphones, also include a search function which permits a user to navigate his or her address book by entering information associated with an entry (i.e., a contact entry's first or last name). However, the ability to locate specific contact information under this model is again predicated on the user's ability to accurately recall specific information about that entry.

Many of today's address books in cellular telephones or smartphones allow a user to arrange contacts by arranging contacts in special lists. For example, a user can have contacts arranged by those contacts which have been most recently dialed, from which the user has most recently received or most recently missed a call, etc., each sorted by date (and often time). However, these special lists are call-oriented, and thus they arrange contacts by information related to calls to the contacts that have taken place (or were supposed to be taking place), and are therefore predicated on either: (1) frequency of communication with a particular contact entry; or (2) proximity in time between a prior communication or attempted communication.

Based on the foregoing, improved methods and apparatus are needed for automating the grouping of contacts within a user's address book, so as to overcome many of the deficiencies present in prior art solutions as set forth above. Such improved methods and apparatus would ideally arrange contacts in a manner better associated with how a user thinks about his or her listing of contact entries, rather than merely organizing contacts in alphabetical order, by manually entered user-defined groupings, or by frequency/timing.

Moreover, such improved methods and apparatus would permit individual contacts to be associated with multiple distinct or inter-related group listings, so as to provide additional flexibility in the representation of these contact entries to a user.

Lastly, these improved methods and apparatus should ideally leverage existing hardware and software to the maximum extent possible so as to facilitate their implementation on existing or legacy devices, as well as minimize deployment costs.

SUMMARY OF THE INVENTION

The present invention satisfies the foregoing needs by providing, inter alia, methods and apparatus for streamlined presentation of information associated with the user's contact entries.

In a first aspect of the invention, a method of receiving presence information is disclosed. In one embodiment, the information is associated with a user's contact listing, and includes: subscribing a user device to a network presence service, the network presence service maintaining a plurality of presence information data associated with at least a portion of the plurality of contact entries present in the user's contact listing; and receiving the plurality of presence information at the user device.

In one variant, the act of receiving the plurality of presence information data is periodically repeated, and initiated in response to a triggering event. For example, the triggering event includes a threshold parameter calculated from information generated by the user device and an apparatus in contact with one or more devices, the devices being associated with entries present in the user's contact listing.

In one implementation, the apparatus in contact with one or more devices associated with entries present in the user's contact listing includes a network-based presence server.

In another variant, the threshold parameter includes a geographic distance between the user device and the one or more devices associated with entries present in the user's contact listing. The geographic distance includes e.g., a relative geographic distance or absolute geographic distance.

In yet another variant, the plurality of presence information data includes at least geographical information associated with the at least a portion of the plurality of entries present in the user's contact listing.

In a second aspect of the invention, a network presence apparatus is disclosed. In one embodiment, the apparatus includes: a processing apparatus; a network interface in data communication with the processing apparatus; and a computer readable apparatus in communication with the processing apparatus and having a storage medium with at least one computer program stored thereon. The at least one computer program includes a plurality of computer executable instructions that, when executed by the processing apparatus: process and store a plurality of presence information associated with a plurality of users of the network; in relation to at least one subscription request received from a subscribing user via the interface, execute an algorithm that utilizes presence information from at least two of the plurality of users to produce a relationship value; and transmit the relationship value to the subscribing user.

In one variant, the relationship value includes a geographic relationship relating geographic positions of the at least two of the users.

In another variant, the apparatus includes a server disposed within the core portion of a cellular mobile network (e.g., 3GPP, UMTS, or LTE/LTE-A compliant network).

In yet another variant, one of the at least two users is the subscribing user.

In a third aspect of the invention, a portable apparatus is disclosed. In one embodiment, the apparatus includes: a processing apparatus; a display device; a network interface in data communication with the processing apparatus; and a computer readable apparatus in data communication with the processing apparatus and having a storage medium with at least one computer program stored thereon, the at least one computer program comprising a plurality of computer executable instructions. When executed by the processing device, the instructions are operative to: transmit a request via the network interface for presence information associated with one or more contact entries of a contact listing stored on the device; receive the requested presence information via the network interface; store the received presence information; process the stored presence information according to a processing algorithm; and selectively present the processed presence information via the display device.

In one variant, the device includes a cellular telephone or smartphone, and the network interface includes an air interface compliant with e.g., the Universal Mobile Telecommunications System (UMTS) standard.

In another variant, the processing of the stored presence information is based at least in part on one or more user preferences provided by a user of the device. The one or more user preferences provided by a user of the device relate to e.g., a geographic proximity of the one or more contact entries, such as (i) a geographic proximity to the device, or (ii) a geographic proximity to a predetermined point not associated with a current location of the device.

In another embodiment, the portable device includes: a processing apparatus; a display device; a network interface in data communication with the processing apparatus; and a computer readable apparatus in data communication with the processing apparatus and having a storage medium with at least one computer program stored thereon, the at least one computer program comprising a plurality of computer executable instructions. When executed by the processing device, the instructions: transmit information regarding one or more user preferences relating to one or more contact entries of a contact listing of the user to a network presence service; receive presence information via the network interface, the presence information having been processed by the network service based at least in part on the one or more user preferences; and present the received presence information to the user via the display device.

In one variant, the display device is a multi-touch touch-sensitive screen, and the transmission of the one or more user preferences is based at least in part on inputs received from the user via the touch-sensitive screen. For instance, the inputs may be first and second touches on the touch-sensitive screen, the first and second touches being used to specify a geographic distance or radius.

In a fourth aspect of the invention, methods of transmitting presence information are disclosed. In one embodiment, the method includes providing geographically-restricted presence information regarding one or more devices, the one or more devices being associated with respective ones of one or more entries in a user's contact listing by: receiving one or more preferences from the user; receiving first location information relating to the one or more devices; receiving second location information relating to a device of the user; and processing the first and second location information based at least in part on the one or more preferences; and based at least in part on the processing, selectively sending the user the geographically-restricted presence information.

For example, in one variant, the first location information includes association of the one or more devices with respective ones of cellular base stations or wireless LAN access points. The second location information includes e.g., GPS coordinates obtained from the device of the user, or vice versa.

In a second variant, the first and second location information includes association of the one or more devices and the device of the user with respective ones of cellular base stations or wireless LAN access points.

In yet another variant, the first and second location information are both derived from GPS receivers.

In a fifth aspect of the invention, a computer readable apparatus is disclosed. In one embodiment, the apparatus includes a storage medium having at least one computer program disposed thereon. The computer program in one variant includes a client application disposed on a UE (e.g., cellular smartphone, PDA, laptop computer, etc.). In another variant, the computer program includes a server-based network presence application.

In a sixth aspect of the invention, a presence system architecture is disclosed. In one embodiment, the architecture includes a plurality of users, a plurality of base stations or access points, and a network presence entity. One or more of the users subscribe to an events package via the network entity, which collects information from others of the users ("targets") relating to the presence service (e.g., their location, activities, status, etc.).

In a seventh aspect of the invention, business methods employing one or more of the aforementioned method and apparatus are disclosed.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 6 illustrates one exemplary configuration of a SIP SUBSCRIBE message utilized in the messaging protocol illustrated in FIG. 5.

FIG. 7 illustrates one exemplary configuration of a SIP NOTIFY message updating a full list of users utilized in the messaging protocol illustrated in FIG. 5.

FIG. 8 illustrates one exemplary configuration of a SIP NOTIFY message updating a partial list of users utilized in the messaging protocol illustrated in FIG. 5.

DETAILED DESCRIPTION OF THE INVENTION

Figure 1:
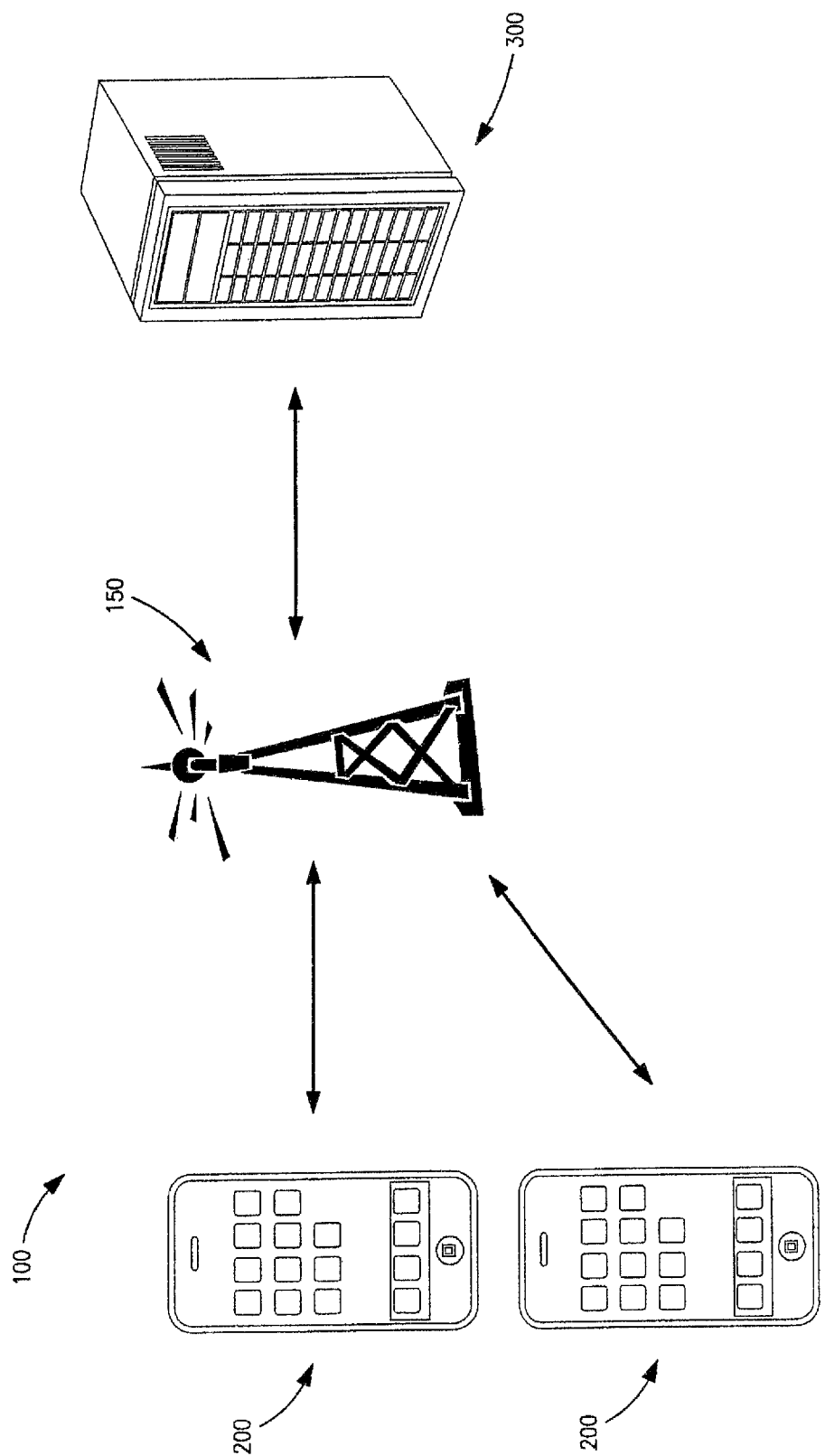
FIG. 1 is a graphical illustration of one exemplary embodiment of generalized system architecture for use in implementing the present invention.

Reference is now made to the drawings, wherein like numerals refer to like parts throughout.

Overview

The present invention discloses in one aspect a presence service and system architecture with the ability to subscribe users to any number of predefined events (in one embodiment via so-called "event packages"), or presence states of interest to those respective users. Examples of these presence states include for example, visibility information such as the current user status (e.g. on-line, off-line, temporarily away from device, etc.), or information about the detailed geographical position of the involved users. For example, in one implementation, a subscribed user can subscribe to an event package that details the geographical presence of contact entries in the subscribed user's address book for a dynamically changing area. This dynamically changing area can include and be defined around, for example, the dynamically changing location of the subscribed user themselves, a fixed point of interest (e.g., home, office, school, restaurant, etc.), or transitory event (e.g., concert, lecture, etc.). Once the subscribed user subscribes to another user's presence (provided the subscribed user is allowed by the other user to subscribe to the other user's presence), the subscribed user becomes a "watcher", and will be informed automatically or according to prescribed rules, based on predefined parameters, about changes in the presence state of the other user.

The presence service described herein in one embodiment assembles users into abstract groupings, such as for example members of a user's family or staff at the user's place of employment. The event package specified by the user (or the user's device) will then allow the user to be notified about users of interest dynamically. For example, the subscribed user may receive presence service information for all entries in the user's address book (or all entries in the abstract groupings described above) that are in "close" geographical proximity to the subscribed user, without necessarily requiring the user's device to analyze proximity data or otherwise require the user's device to receive presence information for every contact entry including those that are not in "close" proximity or not in a predefined abstract grouping associated with the subscribed user. In this fashion, the subscribed user's device is spared from utilizing unnecessary calculation/processing and storage resources (thereby conserving on power in battery-supplied mobile devices), and minimizes consumption of network bandwidth in order to be conveyed the pre-digested information of interest (which, when multiplied across many such user devices, can save appreciable network bandwidth).

Furthermore, the event packages that are based on geographical location also optionally give any other user in the subscribed user's address book the ability to allow or deny certain information being provided to the defined event package of the user, so as to not reveal that other user's geographical location directly. In this fashion, privacy issues may advantageously be respected in the presence service system architecture described herein.

In order to leverage existing technologies, the presence service is, in an exemplary embodiment, built around existing protocols such as the Instant Messaging and Presence Service (IMPS), and the subscribe/notify messages associated with the Session Initiation Protocol (SIP).

Detailed Description of Exemplary Embodiments

Exemplary embodiments of the present invention are now described in detail. While these embodiments are discussed primarily in the context of the Instant Messaging and Presence Service (IMPS) and the subscribe/notify messages associated with the Session Initiation Protocol (SIP) described in IETF RFC 3856 "*A Presence Event Package for the Session Initiation Protocol (SIP)*", J. Rosenberg, August 2004 and IETF RFC 3265 "*Session Initiation Protocol (SIP)-Specific Event Notification*", A. B. Roach, June 2002, each of the foregoing being incorporated herein by reference in its entirety, it will be recognized by those of ordinary skill that the present invention is not so limited. In fact, various aspects of the invention can readily be adapted for use with other presence service protocols. For example, the use of the extensible messaging and presence protocol (XMPP) could readily be used in place of the SIP specific messages described subsequently herein.

Moreover, while the following exemplary embodiments of the invention are primarily described in the context of receiving presence information associated with geographic locations for a subscribed user's contacts, it is appreciated that the present invention is not so limited. In fact, the present invention is envisioned to apply to literally any application where periodic or anecdotal (e.g., event-driven) updates about a user's contacts are desired such as, for example, the periodic updating of an individual entry (e.g. a new job title, phone number, e-mail address, etc.) for a given contact in a subscribed user's address book.

Moreover, while certain embodiments are described in the context of a cellular system (e.g., UMTS, LTE, LTE-Advanced (LTE-A), etc.), the present invention may be applied to literally any type of network architecture or paradigm including e.g., WLANs, MANs (e.g., WiMAX), and enterprise systems (e.g., multi-node wireless systems used to facilitate communication within e.g., a university campus, large enterprise, hospital, etc.).

Presence Services

In general, presence service networks store and distribute presence information to members of that particular presence service. Presence information is generally an indicator of status that conveys, as an example, the ability and the willingness of a potential communication partner (e.g., a user of a client device such as a cellular telephone) to communicate with other entities on the presence service network. In a typical usage scenario, a user's client device provides presence information (such as presence "state") via a network connection to a presence service. The presence information is then stored in a record that is associated with that particular user. The user's presence record (or portions thereof) is then made available for distribution to other users of the presence service to convey information about that particular user (or the user's availability for communication). Various protocols have been developed to facilitate the deployment of presence services. These protocols include, without limitation: the session initiation protocol (SIP); the instant message and presence service (IMPS) protocol; and the extensible messaging and presence protocol (XMPP).

The SIP protocol is an application-layer control protocol that can support the establishment and termination of multimedia communications or sessions through: (1) the determination of the specific end system (or user) to be used for communication; (2) the determination of the willingness of a party to engage in communications; (3) the determination of the media and media parameters to be used in these communications; (4) the establishment of session parameters at both ends of the communication; and (5) session management including the transfer and termination of sessions, modifying session parameters, and invoking various available services. Accordingly, SIP is a useful tool in conveying presence information among users, although it will be appreciated that other protocols (session based or otherwise) may be used consistent with the invention.

It is noted however that SIP is not a vertically integrated communications system; rather, SIP is a component that can be used with other protocols to build a complete multimedia architecture. Accordingly, SIP can be used in conjunction with other defined protocols in order to provide complete services to the users including the presence service(s) contemplated and discussed herein. SIP itself does not provide services, instead SIP is in effect a session carrier or shell, and provides the "primitives" that can be used to implement different services. For example, SIP can locate a subscribed user and deliver an opaque object (such as geographic location information about a given user) to the current location of the subscribed user requesting such information. Accordingly, while the discussion of SIP provides a convenient means for explaining the underlying mechanisms involved in providing the presence services contemplated herein, it should in no way be considered limiting.

Apparatus

Referring now to FIG. 1, one embodiment of system architecture 100 implementing the present invention is illustrated. The system architecture includes one or more user equipment client devices (UE) 200, as well as a network apparatus 300, which are in communication with one another via an intermediary transceiver 150. The UE 200 can include any number of devices including, without limitation, personal computers (PCs), such as for example an iMac™, Mac Pro™, Mac Mini™ or MacBook™, and minicomputers, whether desktop, laptop, or otherwise, as well as mobile devices such as handheld computers, smartphones (such as for example an iPhone™), PDAs, video cameras, set-top boxes, personal media devices (PMDs), such as for example an iPod™ touch, or any combinations of the foregoing. The transceiver 150 can also include any number of devices including, for example, a cellular base station (e.g., UMTS/LTE/LTE-A eNodeB, Home Node B, femtocell, etc.) or a wireless master station or Wi-Fi access point (AP).

The network apparatus 300 consists of a generalized computing apparatus architecture that facilitates the acquisition of data for use in the arrangement of data on the UE 200. While a specific architecture is shown in FIG. 1, myriad different network configurations useful with the present invention will be recognized by those of ordinary skill provided the present disclosure. For example, it is envisioned that in certain implementations, the network apparatus 300 is altogether obviated from the system architecture, with one or more of the UEs (or another entity) performing the processing described subsequently herein.

Figure 2:
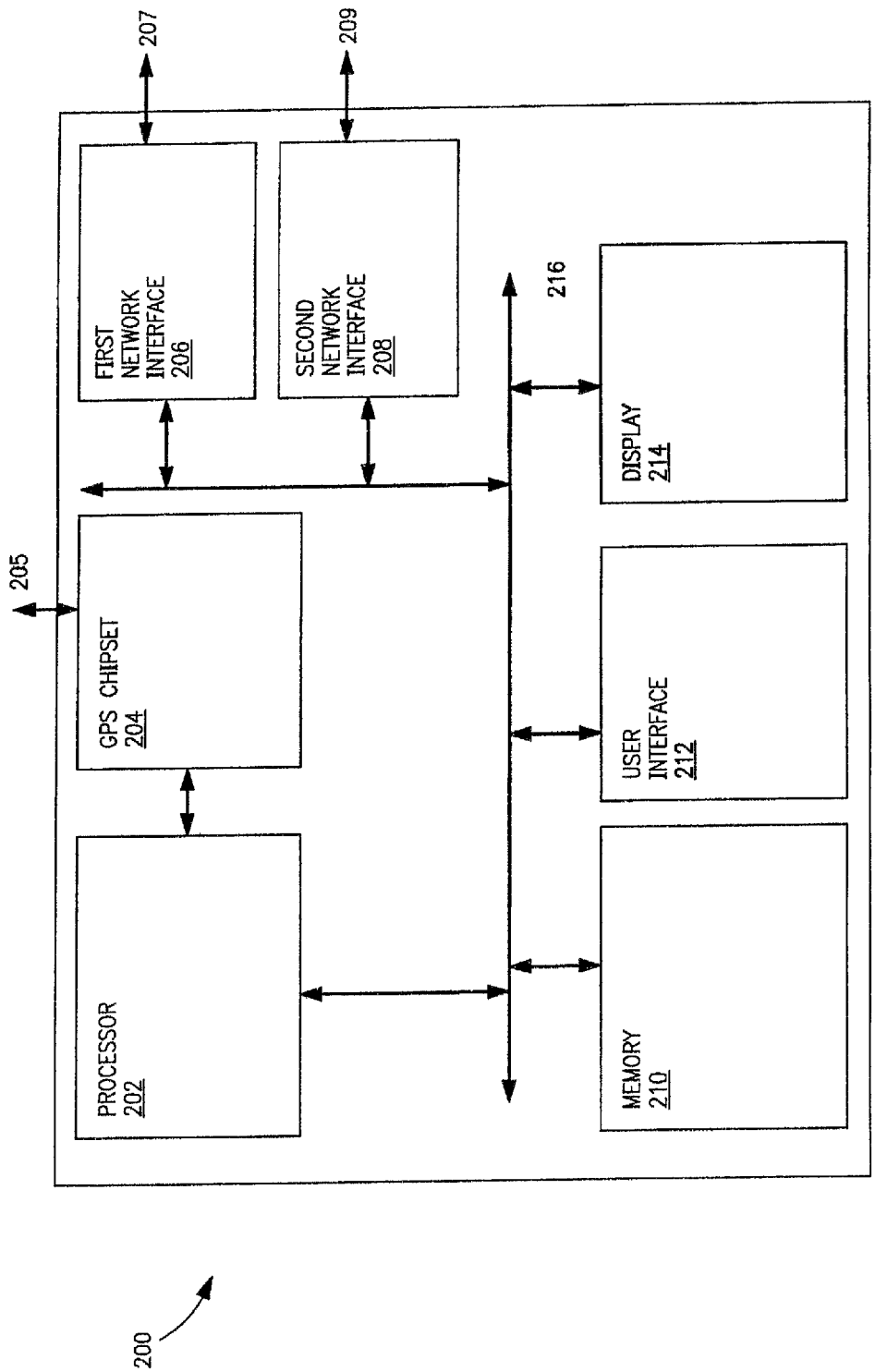
FIG. 2 is a block diagram illustrating one embodiment of user equipment (UE) according to the present invention.

Referring now to FIG. 2, one embodiment of UE architecture 200 according to the invention is illustrated. The UE includes a processor 202 coupled via a bus architecture 216 to a number of different components present within the UE. As used herein, the terms "processor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The UE also includes memory 210 useful, for example, in storing data associated with the arrangement of contact information associated with a user's address book, as described subsequently herein. The term "memory" refers to any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

The UE also includes in one embodiment a global positioning system (GPS) or Assisted GPS (A-GPS) receiver or chipset 204 with an interface 205 capable of communication with GPS satellites orbiting the earth. In addition, the UE also includes a user interface 212 (e.g., a keyboard, trackball, touch screen/multi-touch interface, etc.) as well as a display 214 for conveying the presence information (or manipulated variations thereof) to the user. For instance, the multi-touch interface may be useful in conjunction with an address book application which permits the user to graphically specify various parameters of interest; e.g., a distance or radius between the user and other contacts of interest (such as for a trigger or threshold as described elsewhere herein), or between a fixed or even moving point of interest and one or more contacts in the address book.

In the illustrated embodiment, the UE possesses two network interfaces 206, 208 with respective communication links 207 and 209. In an exemplary configuration, these network interfaces 206, 208 include an interface to both a 3G (e.g., 3GPP or 3GPP2) or LTE/LTE-A wireless network, as well as a Wi-Fi wireless network, although it is appreciated that more or less network interfaces could be present as well as network interfaces to a variety of different protocol standards other than 3 G, LTE/LTE-A and Wi-Fi including without limitation Bluetooth™, HSDPA/HSUPA, TDMA, CDMA (e.g., IS-95A, WCDMA, etc.), GSM, PAN/802.15, WiMAX (802.16), MWBA (802.20), PCS/DCS, analog cellular, satellite systems, millimeter wave or microwave systems, acoustic, and infrared (i.e., IrDA).

The UE of FIG. 2 also includes a client application adapted to run on the UE, and implement several of the presence-related functions as described elsewhere herein, depending on configuration. For example, in one variant (network-based presence processing), the client application communicates with a network-side application (e.g., server in a client-server relationship) to transmit event package subscription requests, user preferences, user location information (e.g., GPS coordinates obtained from the UE's indigenous GPS receiver), etc. The server-side application or portion communicates with the client application/portion to receive this information (and other necessary "ingredients" from network-side infrastructure regarding other users of interest), process it, and generate a suitable presence update message in a suitable format (including an related protocol messages, such as SIP messages as described subsequently herein with respect to FIGS. 5-8) and cause them to be forwarded to the requesting or target UE.

Figure 3:
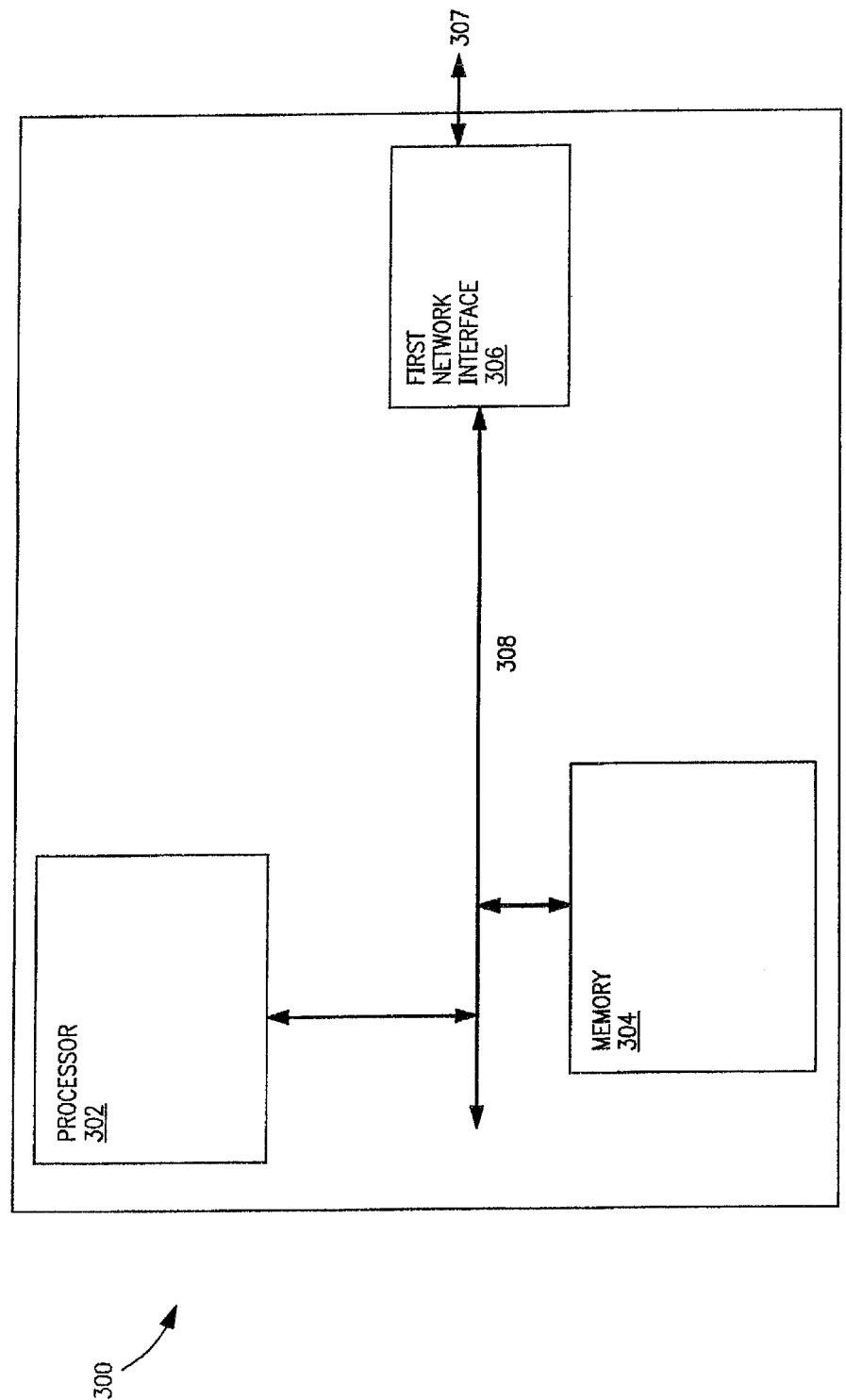
FIG. 3 is a block diagram illustrating one embodiment of network apparatus according to the methodologies of the present invention.

Referring now to FIG. 3, one embodiment of architecture for a network apparatus 300 according to the present invention is described. The network apparatus 300 of FIG. 3 includes a processor 302 coupled to memory 304 via a bus architecture 308. The memory 304 contains one or more computer programs stored thereon that, when executed by the processor, execute one or more method steps as subsequently described herein. The output of the executed method steps is then stored back in memory for later transmission to other entities on the network (such as the exemplary UE of FIG. 2). In addition to the above, the network apparatus 300 also includes a network interface 306 to a communication link 307. The communication link 307 is in operative communication with the various UE devices on the network through either a direct or indirect communications channel (e.g., via a base station in a cellular network, or AP in a WLAN). Accordingly, the data stored that is resultant from the executed method steps can be transmitted to other entities on the network via the communication link.

Methods

Figure 4:
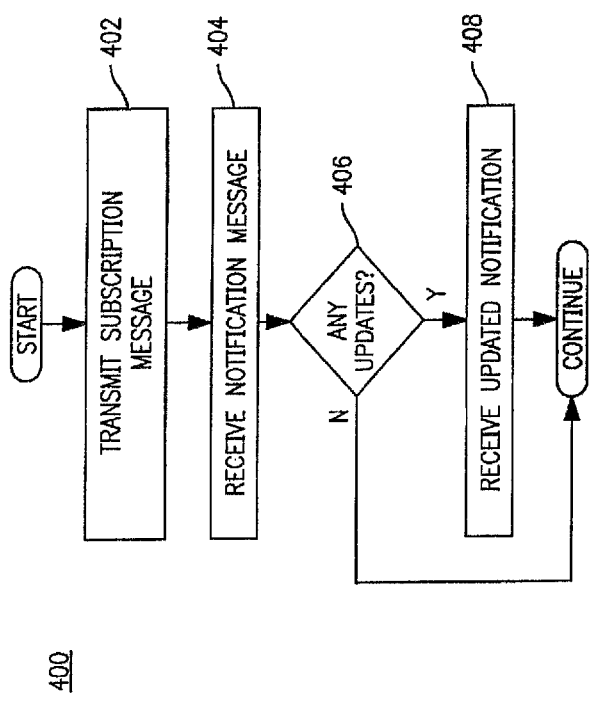
FIG. 4 is a process flow chart illustrating one embodiment of a generalized method for receiving presence service information for a user.

Referring now to FIG. 4, one embodiment of the method for receiving presence service information 400 is shown and described in detail. At step 402, a user transmits a subscription message to a network presence service. This subscription message subsequently allows for the receipt of presence information known to the network. In this fashion, information about other entities, such as the relative geographic locations between various entities (e.g., other UE devices and the subscribing user's UE) can be registered with the presence server.

It is appreciated that in various embodiments of the invention, different mechanisms for determination of relative (i.e., between two or more users, points of interest, etc. without regard to absolute location) and/or absolute geographic location (i.e., as referenced to one or more known geographic or spatial locations) can be used. For example, as noted above, one embodiment of the user's UE may contain apparatus for enabling a geographic location or "fix", such as a GPS/AGPS receiver. This information can be used by the UE's client application described herein (or transmitted for calculation by a network entity, such as a presence server), in conjunction with presence or location information received from other users via the network, to determine relative locations (e.g., via well known distance determination algorithms based on two data points). Once this information is known to the UE within the network, various methodologies can be used to transport this information to a presence server. For example, if direct signaling from a UE to the network is required, the UE may use an HTTP or TCP based direct upload to the presence server. Alternatively, the UE could upload the date to a location server who in turn informs the presence server through the backbone network. Furthermore, other kinds of known transport such as the usage of messaging service like SMS or SIP MESSAGE methods can be utilized as well.

In addition to the aforementioned GPS/AGPS receiver, other mechanisms can be used as well, such as for example (i) association with a given base station within a cellular network or AP within a WLAN (association narrows the user's location down to the effective range of the air interface or less, say a mile or so for a cellular phone, or a 100 yards or so for an 802.11 WLAN transceiver); (ii) "near field" positioning via another air interface (e.g., RFID or NFC interrogator backscatter at a particular location, such as when the user is using an RFID tag to pay for fuel at a gas station); (iii) triangulation via association with two or more base stations in a cellular network (e.g., during handoff), (iv) pairing or bonding of two Bluetooth-equipped devices (known range between the two users is less than 100 feet, regardless of actual or absolute location), and so forth.

Accordingly, if the subscribed user (or the user's device) is authorized to subscribe to this information, then it will be informed about the subscribed to presence information via various presence service parameters of interest to all (or a desired subset) of the subscribed user's contacts. The information of interest is defined in what is known as an "event package". A so-called event package defines the various parameters of interest to one or more users of the service. Within the defined event package, a user can subscribe themselves (and optionally others, such as family members) to any number of different parameters. For example, in the exemplary geographic location scenario described previously herein, a user might separately define an event package for all address book contacts that are labeled as "business contacts". The user may then wish to subscribe to presence information updates from this subgroup of contacts, for example to receive updates whenever one or more of these business contacts are determined to be geographically close to (e.g., within a prescribed radius of) the user at any given time. The different parameters subscribed to by the user in these event packages are nearly limitless, and can include information such as: (1) the geographic location of the subscribed to user (e.g. whether the subscribed to user is in his/her home town or on the road) or alternatively with the exact location of the subscribed to user is (e.g. latitude and longitude) conveyed in, for instance, a RINEX (Receiver Independent Exchange Format) container or the like; (2) defined groupings of address book contacts (e.g. all contacts, family/friend contacts, male versus female contacts, adult versus non-adult (e.g., less than 18 years of age) contacts, business contacts, buddy list contacts, recently visited contacts, recently contacted contacts, etc.); (3) the geographic locations of various groupings of address book contacts; (4) the availability for communication of individual entries within these various groupings; (5) various time parameters for these various groupings (e.g. during the work day, weekends, evenings, etc.); and (6) relative presence information including both discrete and non-discrete parameters (e.g. distance to a given person, distance to a given location, etc.).

It is noted that the "event driven" or triggered model of certain embodiments of the present invention advantageously economizes on both network and UE resources, in that updates under this model may selectively be transmitted only when the prescribed preconditions or triggers are met; e.g., User A within proximity of User B, etc. If User A and B only come in proximity to one another once a week for example, then the update may be sent (or "pulled" in response to a server notification) only once a week as well. This obviates repetitive and resource-consuming rote messaging or updates present in many prior art implementations.

In addition to including completely customizable event packages, one alternative implementation envisions that the user might not desire or otherwise be capable of defining or customizing these event packages at all. Rather these event packages will be delivered pre-defined on the user's device, so that the user is essentially unaware of the specifics of how the underlying address book functionality is implemented. This approach alleviates the user from having to reconfigure their address book and presence service application; the algorithm simply generates historical data on the user's use patterns, and either analyzes this information locally, or sends it to a network entity for analysis (e.g., an algorithm running on a network presence server) to arrive at a fluid profile of the user's habits, and adjust the configuration of the "events package" accordingly. Alternatively, a mixture of pre-defined and customizable event packages can be defined and subsequently subscribed to by the user. Such an alternative would in a desirable implementation be implemented on a GUI interface accessible by the user. For instance, the user might be afforded the opportunity to configure and save multiple "templates" which are individually customized to the user's life style or habits. For instance, a user who is also a student might have one template labeled "At School", which selectively delivers presence information to the user when (i) they are geographically proximate to their school; and (ii) for only contacts listed in the user's address book that are students at the same institution. That same user might also have another template labeled "Going out" which includes all friends (male or female) which the user regularly sees on a social basis, irrespective of geographic location. Myriad other such templates will be appreciated by those of ordinary skill given the present disclosure.

It will also be appreciated that the request or event package subscription generated for a particular user per step 402 above may also be "proxied" or multicast in certain embodiments of the invention. For example, a family member (father) may, assuming appropriate permissions are present within the network presence service, specify one or more event packages for other members of his family, such that the other members of the family (as well as the father) receive presence updates relating to that package. For instance, in one implementation, a father subscribing to a "family location" event package can specify delivery of updates to each of his family members (assuming they are accessible to the network server), such that each member can be apprised of the location of each other member in the family at all times if desired. This might be useful for instance when the family attends a large theme park, national park, shopping mall, etc., so that individuals can know when they are proximate to their family members. Each member can also individually tailor their "triggers" or thresholds in one embodiment; e.g., each have a different distance or radius upon which to be updated. As another option, the status of each family member may be used as a trigger, whether in conjunction with or irrespective of location (e.g., "on line","off-line","mobile", etc.).

At step 404, the subscribed user receives notification messages from the presence service containing information previously defined in the subscribed-to event package(s). Specifically, the user will receive messages that contain presence information of interest as previously defined by the user. The combinations and possibilities of the presence information contained in these notification messages is, as previously described, nearly limitless, and can include information such as relative geographic location information, for the user and other users present in the user's address book, status (e.g., online, offline, busy, etc.), non-user-based relative location (e.g., the geographic location of the user relative to a point of interest, which itself may be fixed or transitory), or absolute location (i.e., the location of one or more other users at any given time).

It will also be appreciated that while the foregoing examples are defined relative to entries in a user's contact or "address book", such definition is not limiting, and in fact other reference sources may be used consistent with the invention. For example, in one variant, another user's address book could be used as a basis for definition of an event package. User A may have User B in their address book, but the event package is defined based on activities within the contact or user base of User B's address book (e.g., send User A presence information when User B comes within geographic proximity of User C, User C being in User B's address book, but not necessarily in User A's book). As one example of how such a scenario might work, User A might be a university professor while User B in the above example is a university which maintains a listing of all students within a course taught by User A. User A can then subscribe to presence information of all users in his or her course offering, without requiring User A to have all these students in his or her address book.

Yet other presence information can be included in these notification messages as well. For example, in one exemplary scenario, a contact entry in a subscribed user's address book may change positions at a company or accept a new job with a new company. Accordingly, it can be expected that the contact entry will update his or her contact information (e.g. e-mail address, work phone/fax number, work address, etc.). Accordingly, this updated information can be included in these notification messages sent to the subscribed user. Other examples of presence information available in these notification messages are described in co-owned U.S. patent application Ser. No. 12/704,449 entitled "METHODS AND APPARATUS FOR CONTACT INFORMATION REPRESENTATION" filed Feb. 11, 2010, the contents of which were previously incorporated herein by reference in its entirety.

In another variant, the user's presence updates for a given event package is triggered off by one or more criteria associated with multiple ones of contacts in the user's address book. For instance, in one implementation, the geographic distance from N (e.g., three (3)) of the user's contacts is used in a logical "AND" function, such that updates will be triggered when all three of the contacts come within proximity of one another; e.g., presenting the opportunity for the four parties (three plus user) to get together for lunch, drinks, or dinner. Moreover, efficient means of contacting all of the "trigger" entities simultaneously or in close temporal proximity can be utilized by the apparatus; e.g., a "callback" function, wherein a common message is multicast to the three parties (for instance "W, X, Y and Z are all local—Let's meet at Restaurant Q" or the like).

In yet another variant, the presence updates are triggered by the movement of one or more contacts within the user's address book. For instance, a subscribed user may only want updates for a given individual when that individual is "on the move"; e.g., has left work or school for the day, or home in the morning. This information can be obtained using any of the aforementioned techniques; e.g., calculating change in position over time via UPS coordinates, change in association with a cellular bases station (e.g., handoff), change in association with a WLAN AP, two PAN (e.g., Bluetooth) pairing or bonding events at different locations (and associated with at least one known contact or user coordinate at each location), etc.

Referring back to the exemplary system architecture of FIG. 1, presence information is retrieved and stored at the network apparatus 300 (e.g., presence server). In addition, the network apparatus 300 utilizes this stored data, and may execute various algorithms thereon in order to change the form of the data that is stored into a form subscribed to by the user in the defined event package, or to generate "derivative" parameters (such as relative location, etc.). For example, in an exemplary use case involving so-called relative geographic locations (e.g. 'near' and 'not so near'), the network entity can take additional absolute geographic location information (i.e. specific GPS coordinates indicative of the fact that the subscribed user is at work or home) and adjust the relative parameters of 'near' and 'not so near' accordingly, which may be based on user input, or alternatively accomplished without user intervention. This is particularly useful in cases where what the subscribed user perceives as 'near' and 'not so near' changes as function of physical location of the user such as, for example, where the user is in his/her home town versus on the road traveling, during "rush hour" (i.e., what is "near" with no traffic may be changed to "not so near" during gridlock conditions, or when roadways are shut down for snow or inclement conditions, etc.), or where the user is in an urban, suburban or rural setting (e.g., based on population density, or the availability of high-speed transit near the user, such as where there are only two-lane 25 MPH speed-limit roads near the user, versus 8-lane superhighway).

As yet another alternative implementation, the proximity information of various other contact entries within a subscribed users address book could be utilized to trigger the use of an alternative air interface. For example, a subscribed user may possess a UE device equipped with a short-range wireless interface such as Bluetooth or IEEE Std. 802.15 PAN, in addition to its mobile cellular interface and/or WLAN (e.g., Wi-Fi) or MAN (e.g., IEEE Std. 802.16 WiMAX) interface. Upon receiving updated presence information indicative of the close proximity of another user device of interest to the subscribed user device, the Bluetooth interface could (via e.g., by way of higher layer messaging passed down through the device's L2CAP layer) initiate a device-to-device connection (e.g., via inquiry, and subsequent pairing or bonding). In one alternative, the presence information received comprises a variety of assistance data aiming at making the connection set-up an easy process, such as the Device-Name or Bluetooth Device-ID, etc. In yet another example, the presence information update message comprises assistance data pertaining to the air interface in question, such as carrier frequency, Bluetooth PIN for pairing, Wi-Fi password, and alike (depending on the wireless technology being used). Accordingly, the Bluetooth interface of the subscribed user's device does not need to constantly scan for other devices to connect to, but rather only scans if the necessary proximity and/or availability of other devices are signaled via the received notification message. Such an alternative implementation is useful where, for example, the subscribed user wishes to exchange contact information with the other user via the Bluetooth interface, rather than transmitting this contact information via the presence service or via other means.

As yet another alternative to the above example, a user is subscribed to presence information associated with WLAN access points. The WLAN access point could update presence status such as,: (1) WLAN AP Off; (2) WLAN AP On without security; and (3) WLAN AP On with security. The user is subscribed to presence information regarding change in presence status of the WLAN AP. Furthermore, this update in presence status may be proximity initiated, i.e. the user only receives update if a relatively close proximity of the user's device to the WLAN AP is detected. Accordingly, the user's device need not have to scan for the WLAN AP at all times, rather it simply connects when in proximity to the WLAN AP and the presence status of the AP is 'On' with security settings matched up with the user's device.

In one embodiment, the foregoing processing and formatting is performed at the network side (e.g., at the network apparatus 300). Performing these operations at the network apparatus is particularly advantageous, as the maintenance and storage of the total set of presence information (including geographic information) could lead to a relatively large amount of calculated and stored data arising from, inter alia, a high number of notifications about changing locations of the subscribed user's contacts, especially taking into consideration that the event packages to which any given user subscribes to at any given time (and the data associated therewith) may be a relatively small subset of the total presence information stored at the network.

Furthermore, as a relatively high amount of calculation resources could potentially be needed to derive a distance value whenever a new location notification is received, it would be desirable to maintain these calculation resources at a fixed centralized location where considerations such as power consumption and data calculation redundancy are not as critical as they are to users of portable devices for example. In this manner, the presence service described herein locates the main calculation function to the network instead of at the subscribed user's UE device (or other portable devices for that matter). Thus both the calculation resources of the subscribed user's device, and network bandwidth of the device-to-network connection, can be economized.

With respect to connection bandwidth, it is further noted that the downstream bandwidth (i.e., from network to a given user's UE) necessary to support presence calculation services disposed on the UE would in most cases be asymmetrically large in comparison to upstream bandwidth requirements (i.e., UE to network), since the user would need to constantly be provided updates on event packages for many more users than simply themselves (the latter being the only updates required in the UE-to-network direction).

However, it is recognized that although desirable to centralize the accumulation, calculation and storage of presence information, the use of a distributed architecture (e.g. where the presence information is maintained by the subscriber devices themselves, and/or processing is performed substantially at the UE, or in combination with the network apparatus 300) is also envisioned as another implementation option according to the invention. For example, the use of such a distributed architecture could largely obviate the need for specialized network hardware (e.g. a centralized presence server) at the expense of increased processing resource usage on the subscribed user's devices themselves.

Moreover, certain "pre-processing" of data could be accomplished at the UE(s), with the pre-processed data being sent to the network apparatus 300 for use. For instance, rather than sending raw GPS coordinate data from the UE to the network apparatus, the UE could be configured to pre-process this data so as to render it into a form useful or more efficient for the network apparatus, and/or determine if the UE is moving (e.g., by sampling GPS coordinates every N seconds), and determine a velocity, direction of movement, or even simply generate a signal or message of "yes" or "no" for movement (which could be used by the network apparatus 300 to invoke a different analysis algorithm for each case).

At step 406, it is determined whether or not any updates to subscribed presence information are available to the user. This can be accomplished in any number of suitable ways. For example, in one exemplary implementation, the user's UE will periodically issue requests to the network apparatus hosting the presence service(s) to which the user is subscribed. In response to these periodic requests, the presence service will transmit updated notification messages to the user, if available. Alternatively, the presence service itself may periodically transmit messages to the subscribed user letting the user know that updated presence information is available (e.g., after paging). If the user desires the updated presence information, the user's UE will issue a request for the updated presence information from the presence network. Alternatively, the user's UE may wait for a preset number of periodic transmissions prior to issuing the request for the cumulative updated presence information.

As yet another alternative, the periodic transmissions will, instead of giving notice to the subscribed user of the availability of updated presence information, periodically transmit the updated presence information without having to be explicitly requested each time. Furthermore, the way updated presence information is received by a user can vary between different event packages and even be defined by the event package itself during the subscription process At step 408, the subscribed user receives the updated notification message from the presence service, whether on a cumulative or individual updated notification message basis.

It is also noted that presence information sent from the network (e.g., from the network apparatus 300 via the transceiver or base station) can be unicast, multicast, or broadcast in nature. For instance, in one variant, presence information is specifically addressed to a particular UE. Alternatively, in another variant, presence information or updates that are applicable to multiple UE (e.g., common contacts within multiple user's address books) can be multicast to multiple UEs simultaneously. Generally applicable updates (such as system information) can be broadcast to all UE.

Figure 5:
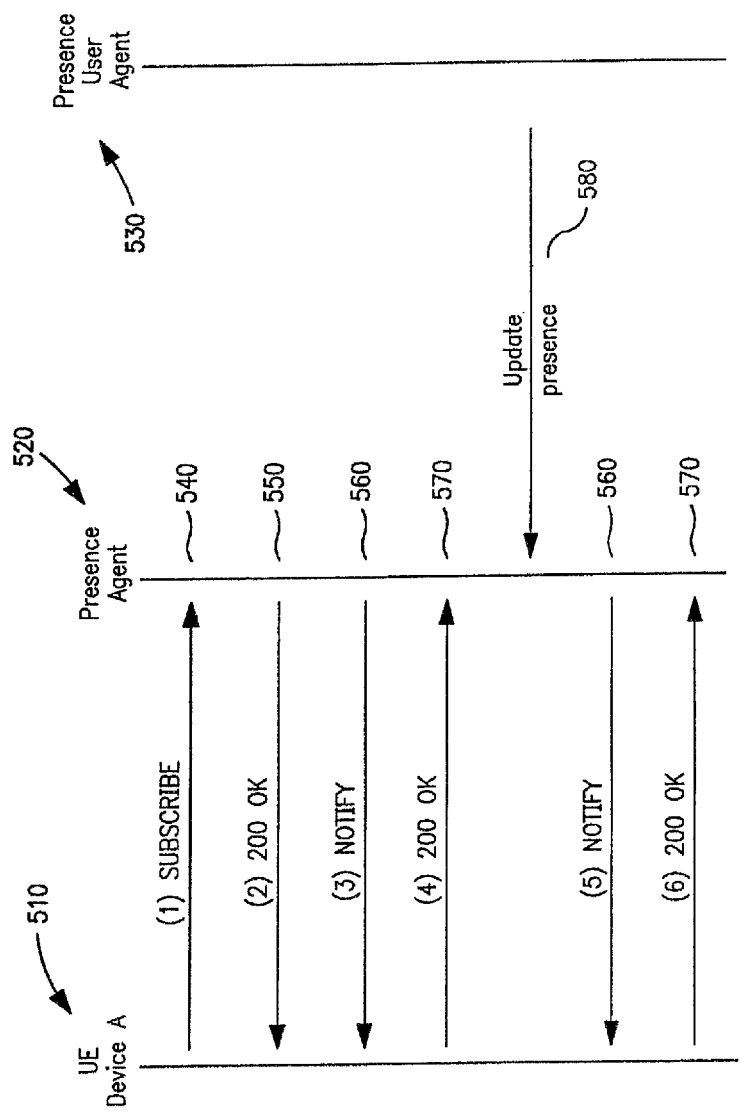
FIG. 5 is a ladder diagram illustrating one embodiment of the messaging protocol implemented between the components of FIG. 1 utilizing the session initiation protocol (SIP).

Referring now to FIG. 5, the methodology of FIG. 4 is now described with regards to a specific SIP signaling example. As previously noted, the following example is but one (SIP-based) implementation of the methods of the present invention; other functions and/or protocols may be used with equal success consistent with the invention.

EXAMPLE #1

As shown in FIG. 5, exemplary presence service messaging is illustrated which utilizes the Session Initiation Protocol (SIP). This presence service leverages existing protocols described in IETF RFC 3856 "*A Presence Event Package for the Session Initiation Protocol (SIP)*", J. Rosenberg, August 2004 and IETF RFC 3265 "*Session Initiation Protocol (SIP)-Specific Event Notification*", A. B. Roach, June 2002, previously incorporated herein. Within the context of SIP, the entities involved in the exchange of presence information comprise: (i) a UE device 510, (ii) a presence agent 520, and (iii) a presence user agent 530 that is of interest to the user of UE device 510. It will be appreciated, however, that other architectures may be used consistent with the invention, such as e.g., the use of a proxy agent, or even another UE as a presence data "source".

In the illustrated example utilizing the SIP protocol, the first message sent from the UE device 510 towards the presence agent 520 is a SIP SUBSCRIBE message 540. The SIP SUBSCRIBE message indicates the event for which notification is requested and includes, among other things, the request Uniform Resource Identifier (URI) which resides in the SIP header along with the event type and additional information in the message body which is optional in nature. The request URI allows for the correct routing of the message and identifies the resource or resources (such as the presence user agent 530) for which event notification is desired. In the event header, one or more types of events are uniquely identified to which the UE device 510 wants to subscribe (see discussion of FIG. 4 supra).

An exemplary SIP SUBSCRIBE message 540 is illustrated in FIG. 6. Within the illustrated SIP header, two new references are given, one to the new event package 600 labeled as "relative-presence" and one to the content type 610 that the UE device 510 can accept (in this context labeled as "application/relative-presence+xml"). The body of the message in the illustrated example of FIG. 6 contains XML-based information about the relation 620 to which the UE device 510 wants to subscribe, entitled "relation-info", and the users 660 about which the UE device wishes to receive changes or updates in the relation notification. Various relation-type parameters also are included. For example, the relation-type parameter 630 "Location" includes relation value parameters such as a defined absolute distance parameter 650 ("rel-value type='absolute'") and a relative distance parameter 640 ("rel-value type='relative'"). Accordingly, for data value variables of the "absolute" type 652, it may be possible to define an absolute distance, e.g. 100 meters. Alternatively for a relative value, the data value 642 could include non-discrete distances, as opposed to discrete absolute distances, such as high-distance, mid-distance or low-distance.

In the illustrated embodiment, the SUBSCRIBE message is usable by presence agent(s) 520 that do not support, for example, relative values, as the UE device 510 requests both relative and absolute values in its SUBSCRIBE message 540. Furthermore, for the presence agent(s) 520 that do allow for the use of relative values, these values allow the network to, for example, apply location-specific values so as to define proximity distance values to be smaller in urban areas than in, for example, suburban or rural areas in order to provide more meaningful presence information to the UE device.

In response to the SIP SUBSCRIBE message 540, the presence agent 520 returns a SIP 200 OK message 550, which acknowledges that the SUBSCRIBE message was received.

In response to the subscription of the UE device 510 to the presence agent, the UE device 510 receives a SIP NOTIFY message 560. An exemplary SIP NOTIFY message 560 is illustrated in FIG. 7. Within the illustrated SIP header, two new references are given, one to the event package 700 previously requested in the SIP SUBSCRIBE message and labeled as "relative-presence", and one to the content type 710 that the UE device 510 stated that it can accept in this context (labeled as "application/relative-presence+xml"). The body of the message in the illustrated example contains XML-based information about the relation 720 that the UE device 510 requested in the SIP SUBSCRIBE message entitled "relation-info". The presence agent 520 uses the SIP NOTIFY message to let the UE device 510 know that it is providing a relation-type value 730 set as "rel-type type='Location'" with the relative value type 740 indicative of a relative distance (i.e. "rel-value type='relative'"). The body of the SIP NOTIFY message also includes parameters that are actually applied by the presence agent; i.e., the relative location detection 742 being set to mid-distance (<rel-value-data>mid-distance</rel-value-data>). The body of the SIP NOTIFY message also includes the parameter <users> that contains a list of users ('user entity' entries) to which the relative location detection applies.

The users state variable 750 is in the present illustration indicative of the fact that the SIP NOTIFY message includes a "full" listing (i.e., all) of users. Note also that the SIP NOTIFY message for the user entities 760 'alice', 'bob', 'charlie' and 'daddy' indicate a parameter 760 where the relative location is not near the UE device 510 (i.e. <proximity-state>Not near</proximity-state>). Furthermore the parameter 772 for the user entity 770 'emmy' is indicative of the fact that UE device 510 is not permitted or allowed to receive information about proximity with regards to this particular presence user agent 530. Upon receiving the SIP NOTIFY message 560, the UE device 510 transmits an acknowledgement message 200 OK 570 towards the presence agent indicative of the fact that the UE device has received the SIP NOTIFY message.

Referring back to FIG. 5, the presence user agent 530 now forwards an update presence message 580 towards the presence agent 520. This may be derived from any number of different data sources.

The presence agent 520 can then utilize this updated presence information (and optionally along with other received presence information) as an input to a predefined algorithm which presents the data in a form suitable for the UE device 510. Herein lies a salient advantage of the present disclosure, in that these notification services allow a UE device 510 to subscribe to events that relate not only to a single resource, but to the dynamic relation between two (or more) resources.

In the context of the aforementioned relative distance example, a new event or a new event description of an existing event allows reference of a first resource and a list of other resources, and also requests notification in case of a change in the relationship between the first resource and any of the other resources. In this example, the UE device 510 requests to be informed about changes in the distance between itself and a list of other devices (i.e., presence user agent(s) 530), such as events associated therewith (e.g., crossing a user-specified threshold). In an exemplary implementation, the SIP NOTIFY message 560 which updates information at the UE device 510 is transmitted as the distance with other devices increases (or decreases) beyond the predefined threshold value. In another embodiment the SIP NOTIFY message 560 which updates information at the UE device 510 is transmitted when the distance between a predefined point of interest (i.e., a location other than the location of the UE device 510) and the other devices increases (or decreases) beyond the predefined threshold value. FIG. 8 illustrates an updated SIP NOTIFY message.

The updated SIP NOTIFY message 560 is illustrated in FIG. 8 as possessing similar characteristics as the SIP NOTIFY message previously discussed with regards to FIG. 7. Specifically, the illustrated SIP header in FIG. 8 possesses the event package 800 previously requested in the SIP SUBSCRIBE message and labeled as "relative-presence" and one to the content type 810 that the UE device 510 stated that it can accept in this context labeled as "application/relative-presence+xml". However, the SIP NOTIFY message of FIG. 8 differs in that the user's state variable 850 is indicative of the fact that the SIP NOTIFY message includes a "partial" listing of users. Note only the user entities 860, 870 for 'alice' and 'bob' are included and indicate a change in parameter 862, 872 where the relative location is now near the UE device 510 (i.e. <proximity-state>Near</proximity-state>). Furthermore, information about the absolute proximity of Alice and Bob are also included in proximity value parameters 864 and 874, respectively. Upon receiving the updated SIP NOTIFY message 560, the UE device 510 transmits an acknowledgement message 200 OK 570 towards the presence agent indicative of the fact that the UE device has received the SIP NOTIFY message. Accordingly, in this fashion, presence information of interest to the user is periodically updated.

Business Methods

The methods and apparatus of the present invention advantageously provide several opportunities for various types of business models and transactions.

For example, in one embodiment, the presence service described herein is made available to users on a subscription or per-use basis. In one model, the subscribing user is provided an unlimited number of presence "updates" and contacts for their monthly subscription fee. Alternatively, a tiered system can be invoked (e.g., X cost up to N used updates/contacts, and then a Y incremental cost for every update and/or contact used).

Alternatively, the user can under another model opt for a "one time" update (or updates for a finite period of time), such as when they only need their presence service on limited or infrequent occasions.

Under another model, the access to the presence data is provided to network subscribers free of charge; however, the user must possess a particular software component (e.g., application) to utilize the data. For example, for a nominal fee, the user can download an application to the user's UE device which enables the functionality described herein. This application could be downloaded from, for example, the iPhone "App store" operated by the Assignee hereof.

As an alternative to the payment of a fee for the use of the presence service described herein, the presence service described herein could be used as a marketing tool for a network operator or third-party. For example, the location or proximity information of the subscribed user could be used as an input to determine geographically proximate businesses or points of interest; these could be advertised on the user's UE device (e.g., via pop-up windows, banner ads, "related" hyperlinks, etc.). As one exemplary example, by downloading the application to the user's phone, the application will provide geographically appropriate advertisements should the user operate their phone's browser. These ads could be distributed to the user either using the presence service described herein directly, or alternatively could be supplied to the user through other traditional ad targeting means.

Historical presence information may also be utilized as the basis of a marketing or business model. For instance, past physical proximity to say three (3) other users in the user's address book at the same time at a prescribed location (e.g., corresponding to a favorite restaurant) could be used in conjunction with contemporaneous proximity information as a keying or prompting even, such as when: (i) a subscribed user is proximate to the restaurant, they might be preferentially shown an advertisement for that restaurant, knowing that the user had eaten there before; or (ii) the subscribed user is proximate to (or selects from their address book) another of the three individuals present at that restaurant in the past, they would be shown an advertisement for that restaurant on the hopes that they might repeat their visit with one or more of the same other users.

It is also recognized that the operation of the presence service and apparatus described herein can be performed so as to optimize one or more business or operational goals or aspects. For example, where network (e.g., downstream) bandwidth is restricted or highly utilized, presence service updates can be delayed or staggered across the network, so as to preferentially make the remaining bandwidth available for higher priority services (e.g., voice or data services). Similarly, the scope of service provided to one or all users can be restricted, albeit not delayed (e.g., by allowing only updates for certain event packages, updates only for a smaller subset of other users rather than the complete set specified by the package, etc.). To this end, the subscribing user may also be given the opportunity to prioritize their subscribed event packages; e.g., family package first, friends at school package second, etc. The network provider may also vary or tier its rate structure for these different priorities if desired, and/or vary their rates based on time of day, network congestion, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A network presence apparatus, comprising:
   a processing apparatus;
   a network interface in data communication with the processing apparatus; and
   a storage medium with a plurality of computer instructions stored thereon, the plurality of computer instructions executable by the processing apparatus to cause the processing apparatus to:
   receive a plurality of location information data associated with a plurality of user devices of a network presence service, the plurality of user devices comprising a first user device, a second user device, and a plurality of third user devices;
   receive, from the first user device, first information defining an event regarding the plurality of location information, wherein the first information further identifies the second user device based on a contact entry of a first contact listing stored on the first user device, and wherein the event is based at least in part on the location information data associated with the third user devices;
   identify the third user devices based on the first information and further based on a second contact listing stored on the second user device, wherein at least one of the third user devices is not identified by a contact entry of any contact listings stored on the first user device;
   determine, based on the identifying the third user devices and on the plurality of location information, that the event has occurred;
   transmit via the network interface, in response to the determining that the event has occurred, to the first user device, a notification that the event has occurred;
   receive, from the first user device, a request for the location information data upon which the event is based; and
   transmit via the network interface the requested location information data to the first user device, in response to the request for the location information data.

2. The network presence apparatus of claim 1, wherein the transmitting the notification that the event has occurred further comprises transmitting location information associated with the third user devices, wherein the location information associated with the third user devices is derived from the location information data associated with the third user devices.

3. The network presence apparatus of claim 2, wherein the transmitting the location information associated with the third user devices is periodically repeated after the determining that the event has occurred.

4. The network presence apparatus of claim 1, wherein the event comprises a geographic distance between the first user device and one or more of the third user devices dropping below a threshold.

5. The network presence apparatus of claim 1, wherein the event comprises a geographic distance between the second user device and one or more of the third user devices dropping below a threshold.

6. The network presence apparatus of claim 1, wherein the event comprises a geographic distance between two or more of the third user devices dropping below a threshold.

7. The network presence apparatus of claim 1, wherein the event comprises a geographic distance between one or more of the third user devices and a predetermined geographic location dropping below a threshold.

8. The network presence apparatus of claim 1, wherein the first information defines a plurality of events, wherein at least one event of the plurality of events comprises the first user device being within a predefined geographic area.

9. A method of providing presence information, comprising:
   by a processing apparatus of a network presence apparatus:
   receiving a plurality of presence information data associated with a plurality of user devices of a network presence service, the plurality of user devices comprising a first user device, a second user device, and a plurality of third user devices;

receiving, from the first user device, first information defining an event, wherein the first information further identifies the second user device based on a contact entry of a first contact listing stored on the first user device, and wherein the event is based at least in part on presence information data associated with the third user devices;

identifying the third user devices based on the first information and further based on a second contact listing stored on the second user device, wherein at least one of the third user devices is not identified by a contact entry of any contact listings stored on the first user device;

determining, based on the identifying the third user devices and on the plurality of presence information data, that the event has occurred;

transmitting, in response to the determining that the event has occurred, to the first user device, a notification that the event has occurred;

receiving, from the first user device, a request for the presence information data upon which the event is based; and transmitting the requested presence information data to the first user device, in response to the request for the location information data.

10. The method of claim 9, wherein the transmitting the presence information is periodically repeated after the determining that the event has occurred.

11. The method of claim 9, wherein the plurality of presence information data comprises information regarding at least one of status or present activity.

12. The method of claim 9, wherein the plurality of presence information data comprises location information.

13. The method of claim 12, wherein the event comprises a geographic distance between the first user device and one or more of the third user devices dropping below a threshold.

14. The method of claim 12, wherein the event comprises a geographic distance between the second user device and one or more of the third user devices dropping below a threshold.

15. The method of claim 12, wherein the event comprises a geographic distance between one or more of the third user devices and a predetermined geographic location not associated with a current location of the first user device dropping below a threshold.

16. The method of claim 12, wherein the first information defines a plurality of events, wherein at least one event of the plurality of events comprises the first user device being within a predefined geographic area.

17. A first portable computing device, comprising:
a processing apparatus;
a network interface in data communication with the processing apparatus; and
a storage medium with a plurality of computer instructions stored thereon, the plurality of computer instructions executable by the processing apparatus to cause the processing apparatus to:

transmit to a network presence apparatus, via the network interface, location information data associated with the first portable computing device, wherein the network presence apparatus is configured to receive the location information data from the first portable computing device and location information data from a second portable computing device and location information data from a plurality of third portable computing devices;

transmit to the network presence apparatus, via the network interface, first information defining an event, wherein the first information further identifies the second portable computing device based on a contact entry of a first contact listing stored on the first portable computing device, and wherein the event is based at least in part on the location information data associated with the plurality of third portable computing devices;

receive from the network presence apparatus, via the network interface, a notification that the event has occurred, wherein the event is determined to have occurred by the network presence apparatus at least in part in response to the third portable computing devices being identified by the network presence apparatus, wherein the third portable computing devices are identified based on the first information and further based on a second contact listing of the second portable computing device, wherein at least one of the third portable computing devices is not identified by a contact entry of any contact listings of the first portable computing device;

transmit to the network presence apparatus, via the network interface, a request for the location information data upon which the event is based; and receive from the network presence apparatus, via the network interface, the requested location information data, in response to the request for the location information data.

18. The first portable computing device of claim 17, wherein the receiving the notification that the event has occurred further comprises receiving location information associated with the plurality of third portable computing devices, wherein the location information associated with the plurality of third portable computing devices is derived from the location information data associated with the plurality of third portable computing devices.

19. The first portable computing device of claim 17, wherein the first contact listing stored on the first portable computing device comprises an address book application running on the first portable computing device.

* * * * *